Oct. 15, 1968 R. J. MISTARZ 3,405,505
MACHINE FOR AUTOMATICALLY FORMING, FILLING, CLOSING
AND SEALING CARTONS
Filed Nov. 9, 1964 13 Sheets-Sheet 2
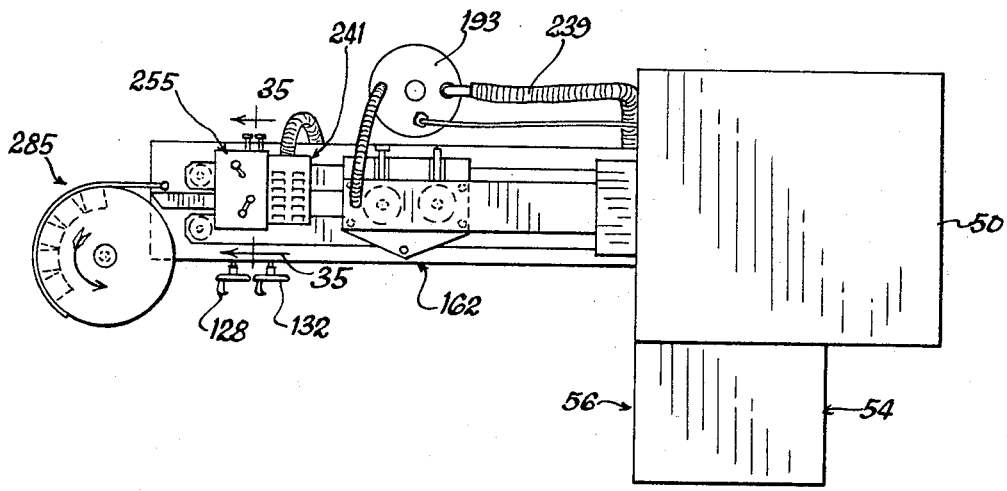
FIG. 2
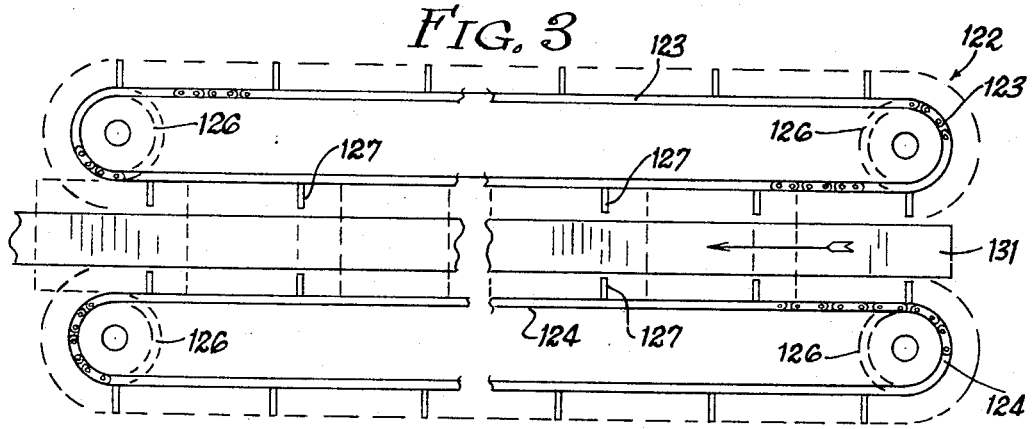
FIG. 3
FIG. 4
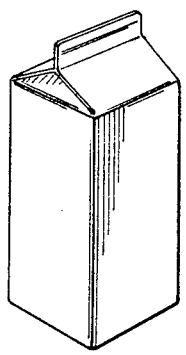
FIG. 5
FIG. 6
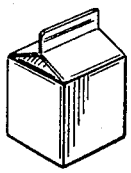
INVENTOR
Robert J. Mistarz
By Max R. Kraus
Att'y

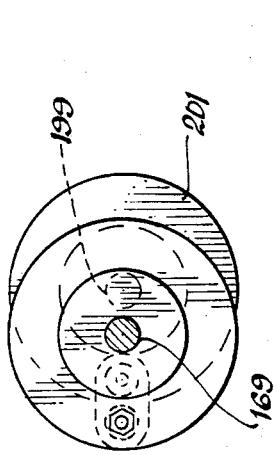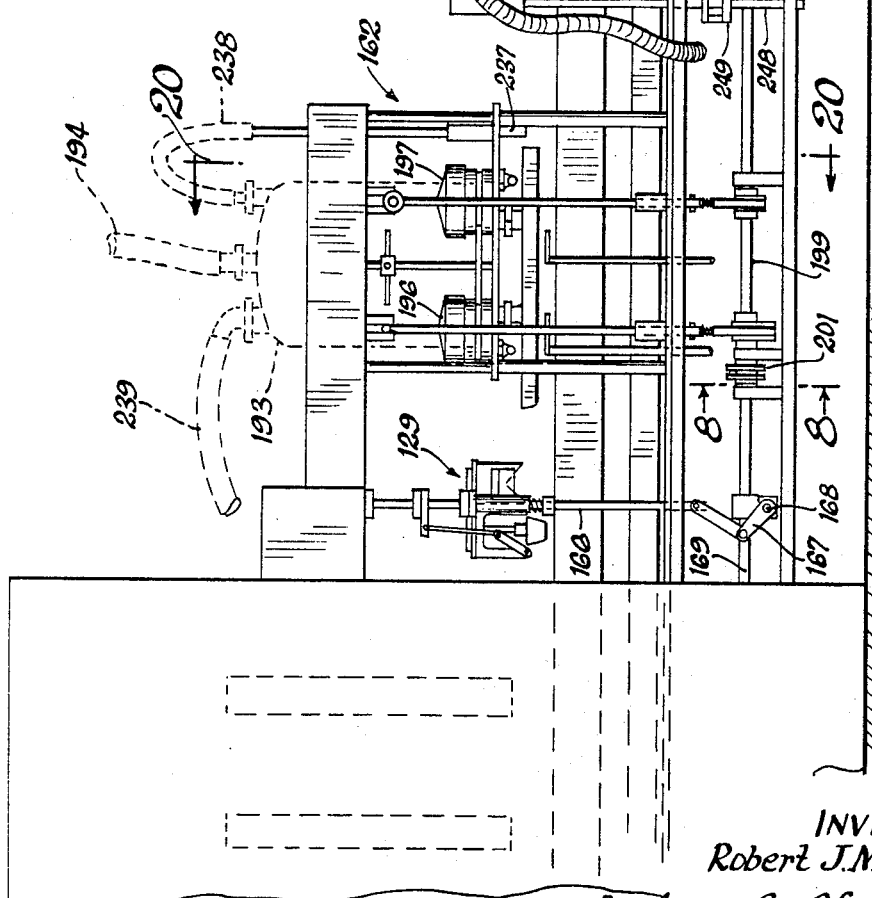

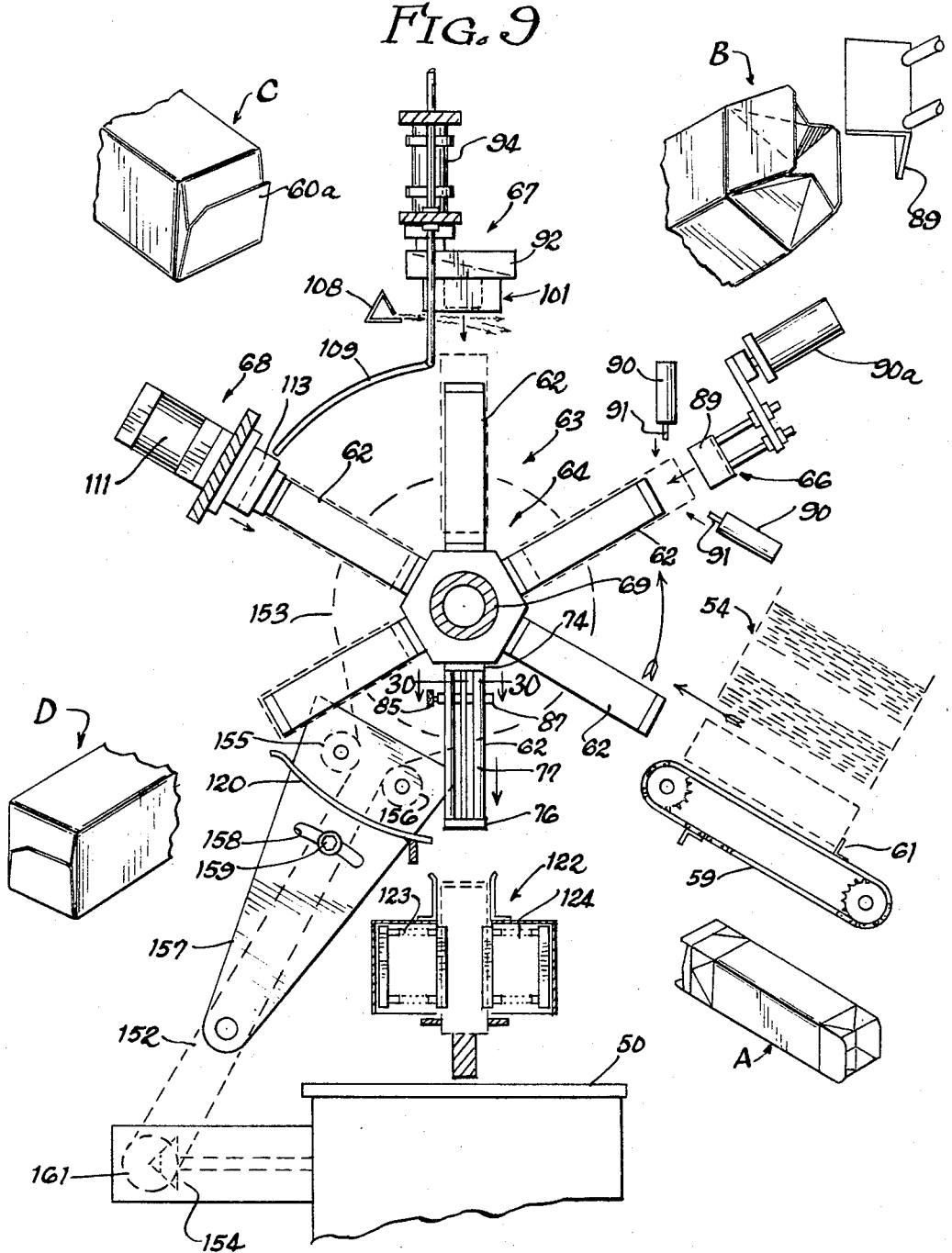

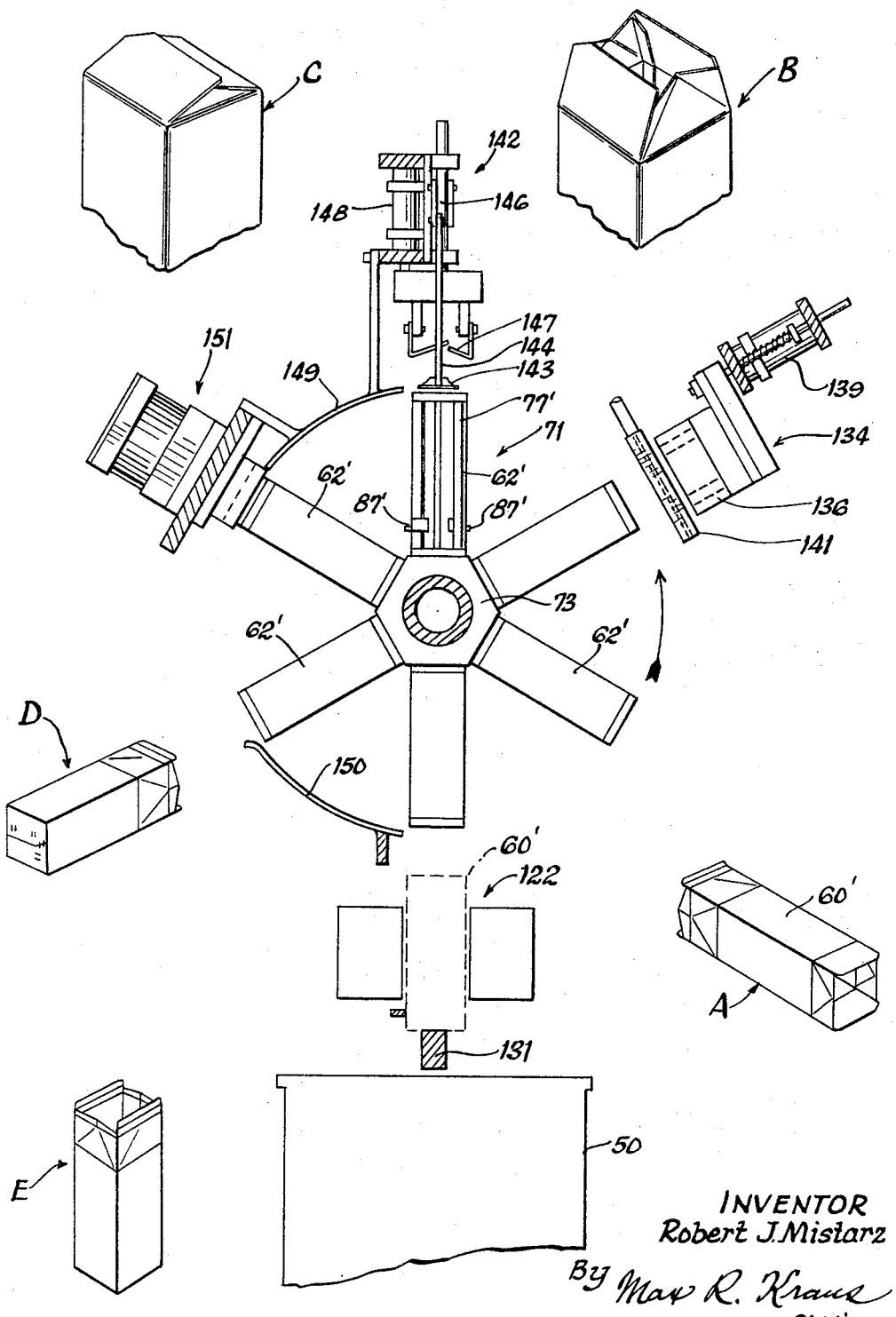

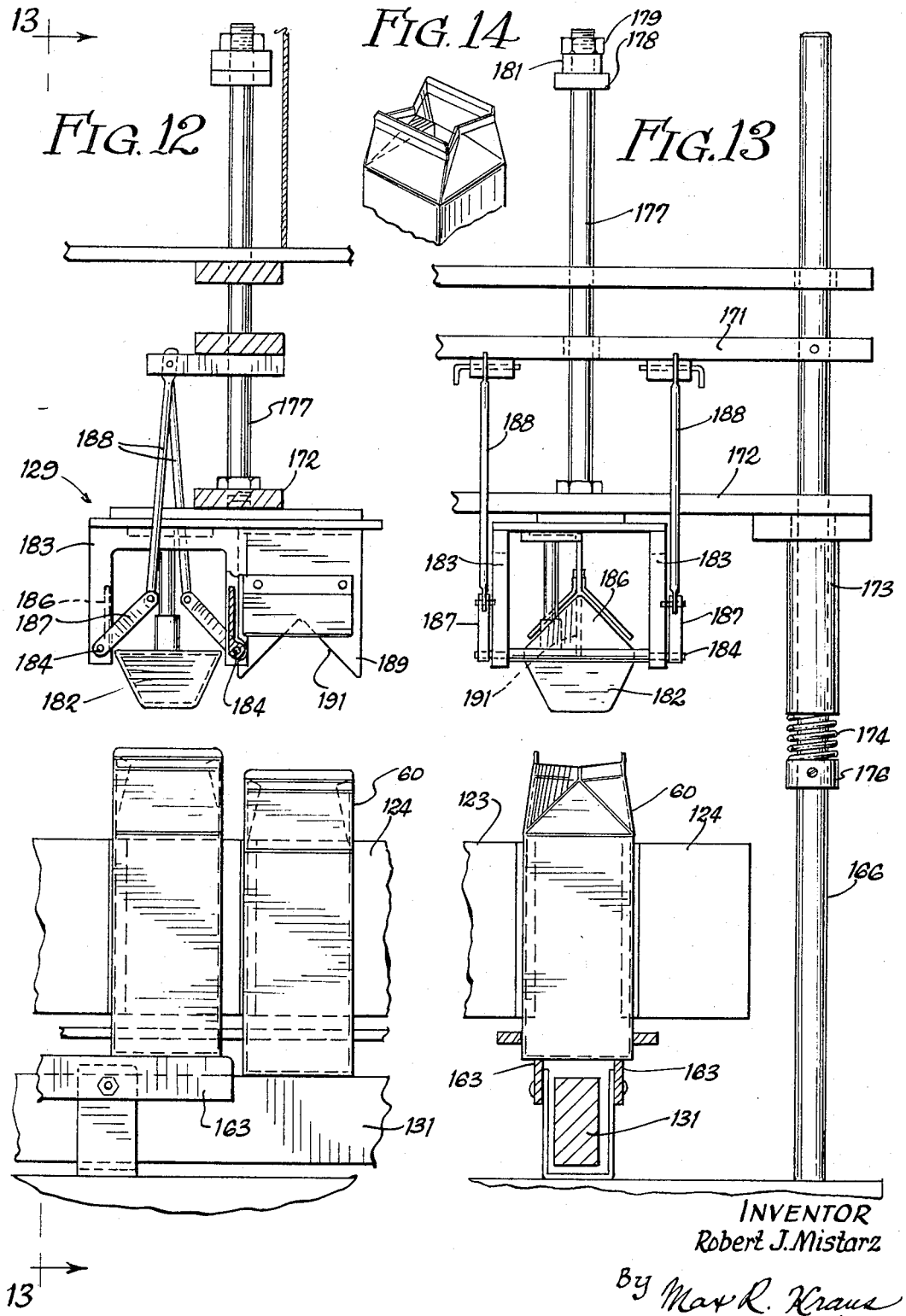

Oct. 15, 1968       R. J. MISTARZ       3,405,505
MACHINE FOR AUTOMATICALLY FORMING, FILLING, CLOSING
AND SEALING CARTONS
Filed Nov. 9, 1964       13 Sheets-Sheet 8
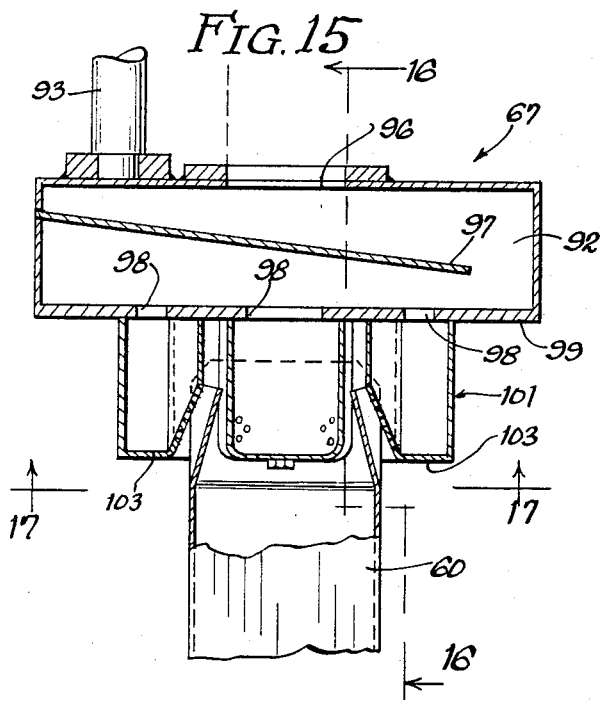
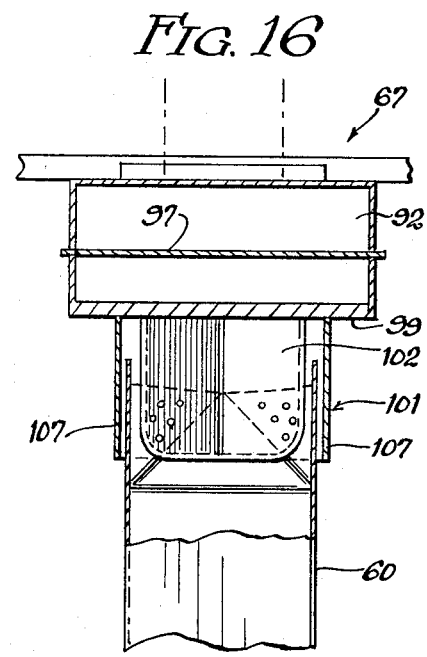
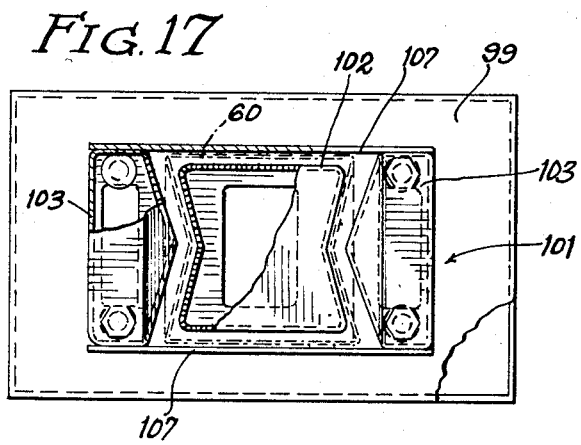
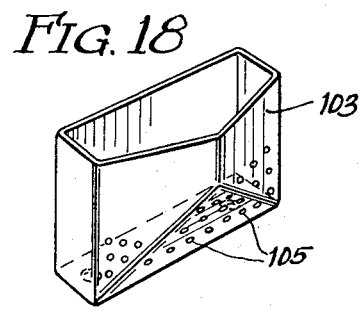
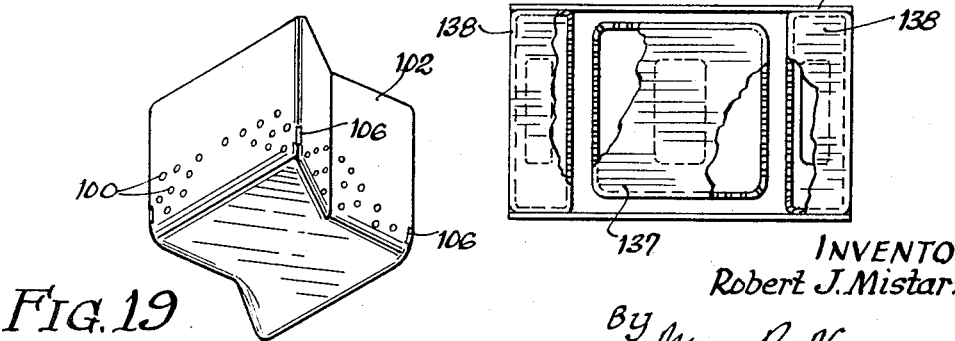
INVENTOR
Robert J. Mistarz
By May R. Kraus
Atty

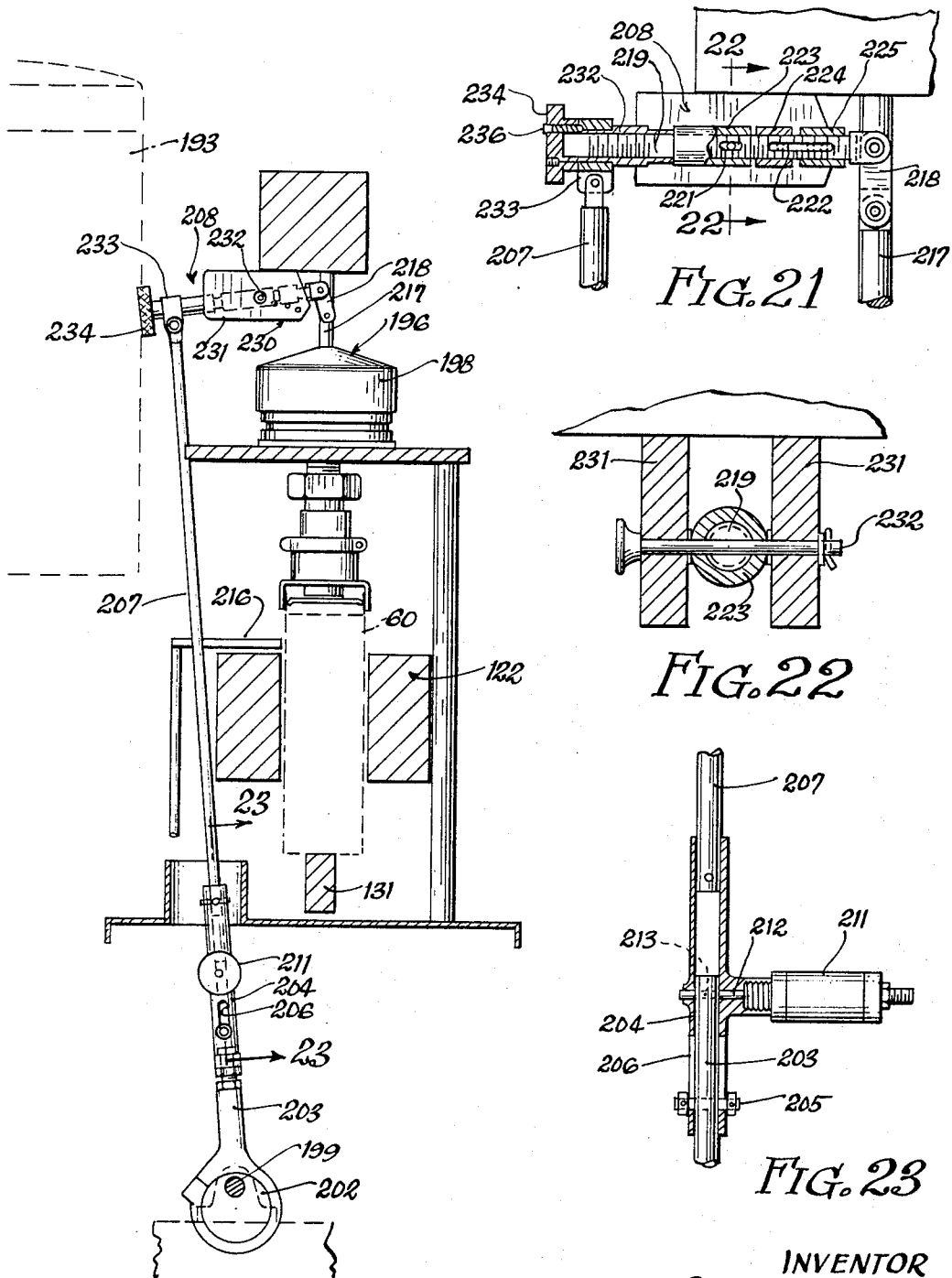

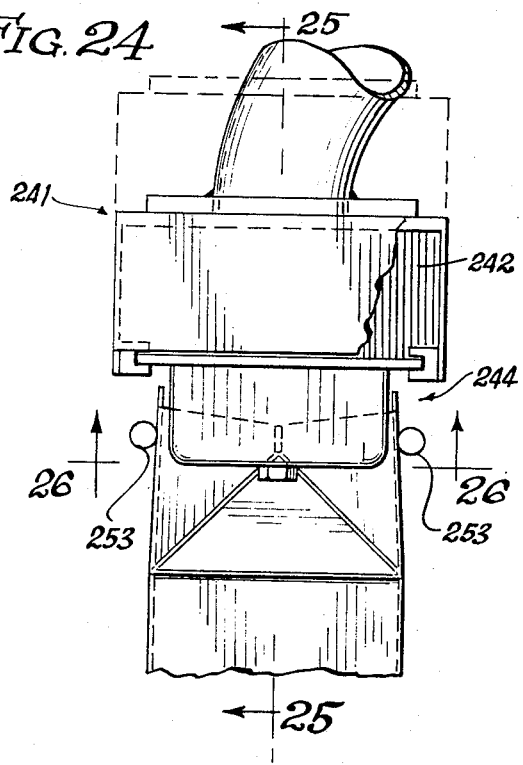
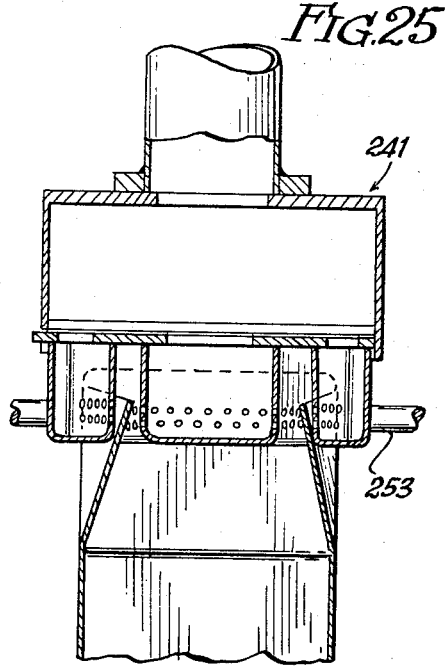
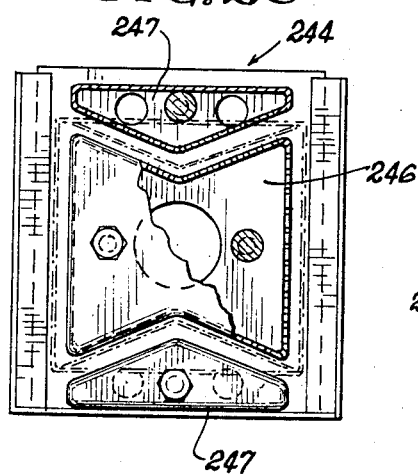
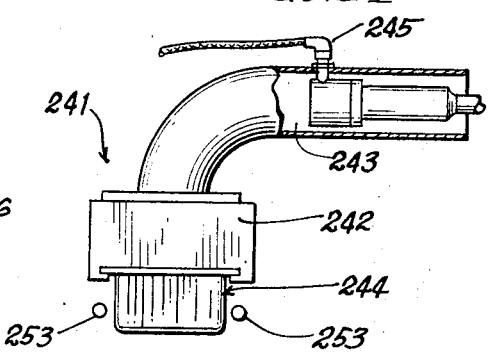

INVENTOR
Robert J. Mistarz
By Max R. Kraus
Att'y

Oct. 15, 1968
R. J. MISTARZ
3,405,505
MACHINE FOR AUTOMATICALLY FORMING, FILLING, CLOSING AND SEALING CARTONS
Filed Nov. 9, 1964
13 Sheets-Sheet 12
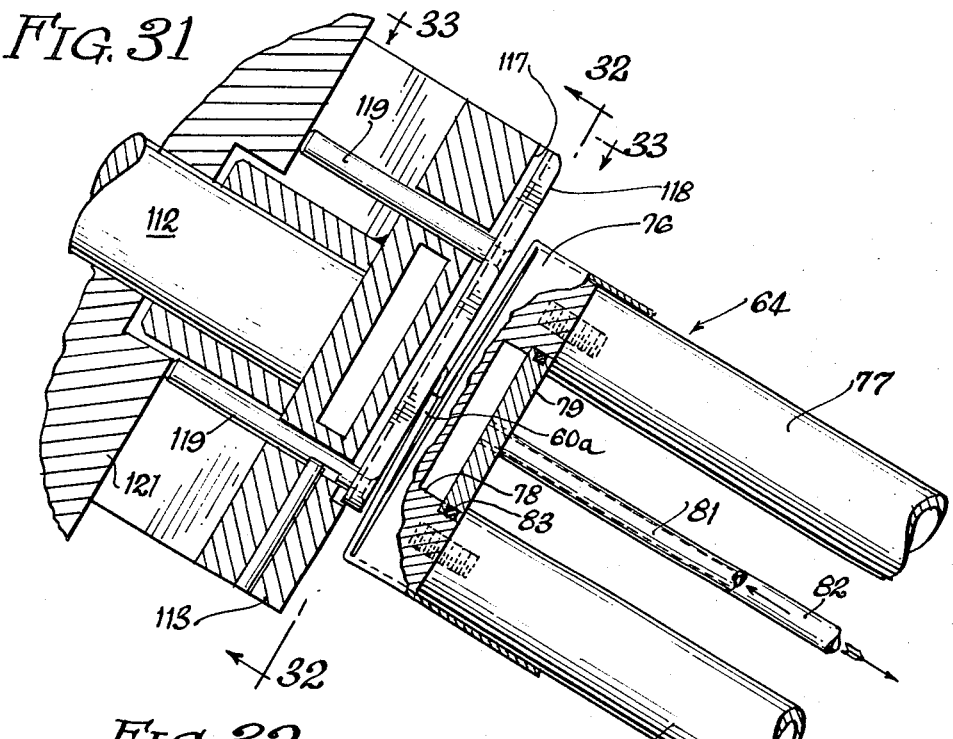
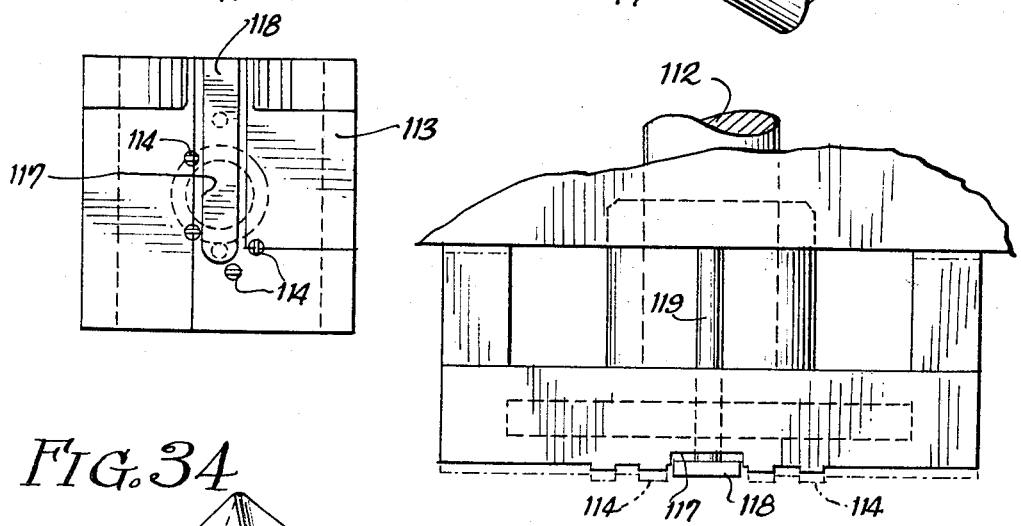
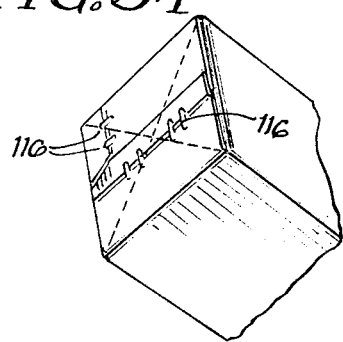
INVENTOR
Robert J. Mistarz
By Max R. Kraus
Att'y

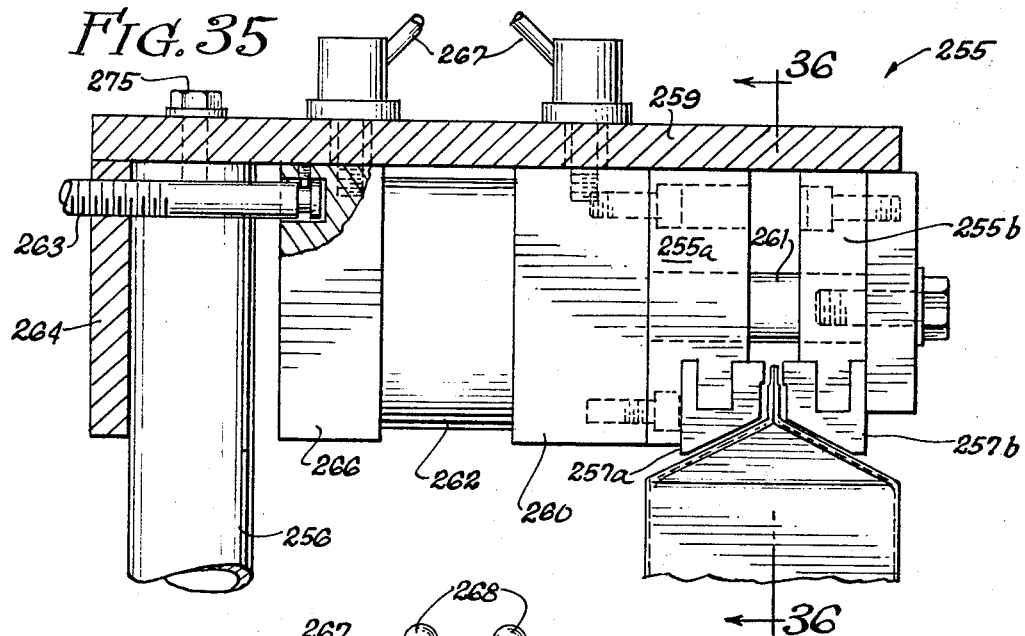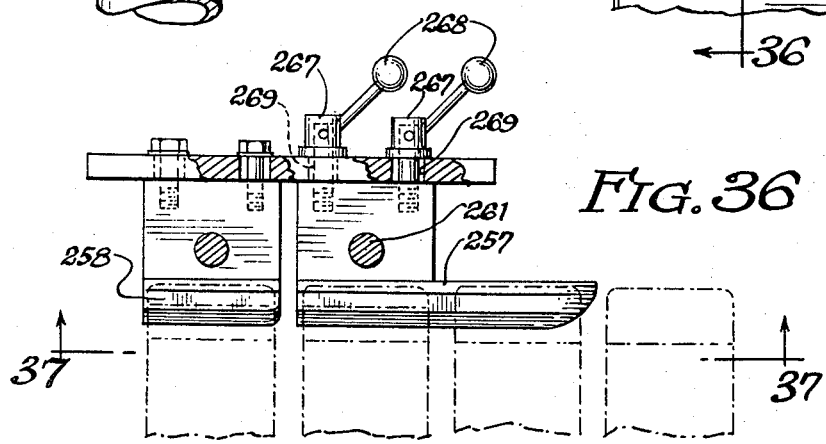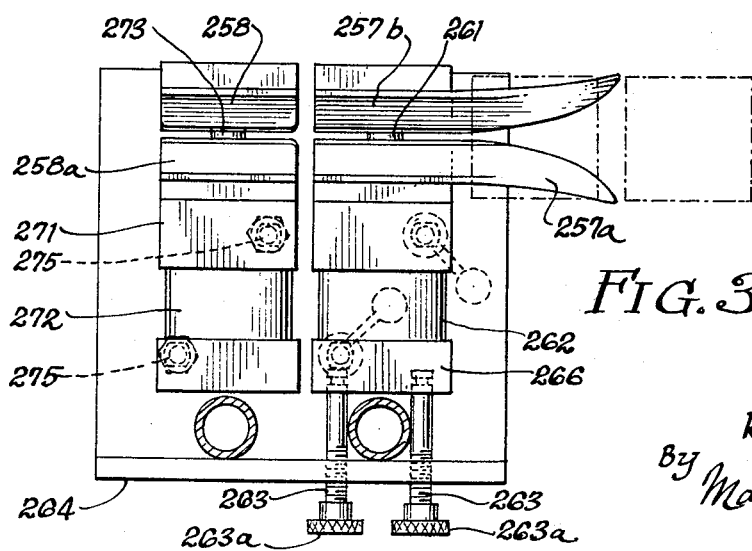

United States Patent Office 3,405,505
Patented Oct. 15, 1968

3,405,505
MACHINE FOR AUTOMATICALLY FORMING, FILLING, CLOSING AND SEALING CARTONS
Robert J. Mistarz, Northbrook, Ill., assignor to Illinois Creamery Supply Co., Chicago, Ill., a corporation of Illinois
Filed Nov. 9, 1964, Ser. No. 409,911
9 Claims. (Cl. 53—183)

This invention relates to a machine for forming, filling and closing plastic coated gable-top cartons.

One of the objects of this invention is the provision of an improved unitized machine for automatically forming plastic coated carton blanks into erected cartons, filling the same with a liquid, and closing and sealing the cartons into fluid-tight packages.

Another object of this invention is the provision of a machine of the foregoing type which is adaptable to operate on and fill cartons having different base sizes, for example, quart and half-gallon sizes, thereby eliminating the necessity for employing two different machines, each intended to produce only one size of filled cartons, as in prior art practices.

Another object of this invention is the provision of novel means for accurately heating only the sealing areas of a carton with thermostatically controlled heated air to render the coating of said areas thermoplastic and adhesive for effecting a positive seal and improved appearance of the carton, as well as effecting economies in operation and avoiding undue dissipation of heat into the space where the machine is in operation.

Still another object of this invention is the provision of a pneumatically operated means providing precise and controlled pressure for sealing the thermoplasticized areas of the carton.

Still another object of this invention is the provision of a positive chain-drive means for removing the carton from the forming mandrel and depositing the same onto conveying means for transport successively to the filling means and to the top closure sealing means, the distance traveled by the carton in such removal being only slightly greater than the length of the carton itself, thus, avoiding excessive manipulation or handling of the carton, as in prior art machines.

A further object of this invention is the provision of means for laterally and vertically adjusting the carton conveyer means to accommodate cartons of different heights and base sizes.

A further object of this invention is the provision of novel means for advancing or retarding the carton conveyer means to syncchronize the movement of the same with the operation of the filling means, thereby to effect proper alinement of the different sized cartons with the breaker and filling means.

A further object of this invention is the provision of means for maintaining the cartons in proper alinement on the conveyer means so that the score lines of the carton top may be accurately broken preparatory to folding.

Still a further object of this invention is the provision of novel positive filling means for more rapid and accurate filling of the cartons with a minimum of foaming.

Still a further object of this invention is the provision of novel filling means having micrometer adjustment means for accurately calibrating the volume of liquid discharged into a carton.

A further object of this invention is the provision of novel readily accessible means for effecting accurate alinement of the top sealing lips of a carton in the final sealing operation, thereby to insure proper sealing and improved appearance of the sealed carton, said means being easily adjustable even while the machine is in operation.

Still a further object of this invention is the provision of safety means automatically operable to withdraw the heating means from close proximity to the carton being heated, in the event that the machine is required to be stopped to correct a malfunction or for other reasons, thereby to prevent igniting the carton.

Still a further object of this invention is the provision of safety means automatically operable to direct a blast of air between the heating means and the carton being heated, during the interval in which the machine is stopped so as to prevent igniting the carton.

Still a further object of this invention is the provision of means to render the filling means inoperative and prevent discharge of liquid in the event a carton is not in position to receive the liquid.

Other and further objects and advantages of this invention will become apparent from the following description when the same is considered in connection with the accompanying drawings, in which:

FIG. 2 is a top plan view thereof.

FIG. 3 is a schematic plan view of the adjustable carton conveyer.

FIGS. 4, 5 and 6 are perspective views, respectively, of half-gallon, quart and pint size cartons erected, filled and sealed and in the condition in which they are discharged from the machine of FIG. 1 upon completion of their processing.

FIG. 7 is a rear elevational view of the machine illustrated in FIG. 1.

FIG. 8 is a cross-sectional view, on an enlarged scale, taken substantially on line 8—8 of FIG. 7.

FIG. 9 is a more or less diagrammatic view showing the mandrel wheel assembly for forming quart size cartons, including various associated means for operating on the cartons at different stations along their path of movement, and showing also the cartons in various stages of formation.

FIG. 9a is an elevational view showing the means for initially opening the carton blanks.

FIG. 10 is a view similar to FIG. 9 and showing the mandrel wheel assembly and associated means for operating on a half-gallon size carton.

FIG. 12 is a side elevational view, on an enlarged scale, of the top breaker mechanism.

FIG. 13 is an end view taken substantially on line 13—13 of FIG. 12.

FIG. 14 is a fragmentary perspective view showing the upper portion of a carton after it has been operated on by the top breaker mechanism.

FIG. 15 is a cross-sectional view, on an enlarged scale, showing the heating unit for heating the bottom closure parts of a quart size carton for sealing.

FIG. 16 is a cross-sectional view taken substantially on line 16—16 of FIG. 15.

FIG. 17 is a bottom plan view taken substantially on line 17—17 of FIG. 15, with certain parts broken away to show structural details.

FIG. 17a is a view similar to FIG. 17 showing a heating unit for heating the bottom closure parts of a half-gallon size carton.

FIGS. 18 and 19 are perspective views of the heating unit components.

FIG. 20 is a cross-sectional view, on an enlarged scale, taken substantially on line 20—20 of FIG. 7.

FIG. 21 is a cross-sectional view of a structural detail illustrated in FIG. 20.

FIG. 22 is an enlarged cross-sectional view taken substantially on line 22—22 of FIG. 21.

FIG. 23 is a cross-sectional view on an enlarged scale taken substantially on line 23—23 of FIG. 20.

FIG. 24 is an enlarged elevational view of the heating unit for heating the top closure parts of the carton.

FIG. 25 is a cross-sectional view taken substantially on line 25—25 of FIG. 24.

FIG. 26 is a bottom plan view taken substantially on line 26—26 of FIG. 24.

FIG. 27 is a fragmentary elevational view showing the heater unit and associated combustion chamber.

FIG. 31 is an enlarged fragmentary cross-sectional view of the bottom closing unit and a carton in registration therewith preliminary to sealing of the bottom closure parts.

FIG. 32 is a bottom view, on a reduced scale, taken on line 32—32 of FIG. 31.

FIG. 33 is a top view taken on line 33—33 of FIG. 31.

FIG. 34 is a perspective view of the sealed carton bottom.

FIG. 35 is an enlarged cross-sectional view taken on line 35—35 of FIG. 2.

FIG. 36 is a cross-sectional view taken on line 36—36 of FIG. 35.

FIG. 37 is a cross-sectional view taken on line 37—37 of FIG. 36.

The machine of the present invention is intended to process conventional plastic-coated gable-top cartons formed of paperboard or the like, and presently extensively employed for packaging milk and other liquids. The carton blank as it is delivered to the machine for processing is folded upon itself and has its side seam already adhesively secured, thus defining a collapsed open ended tube. The closure parts at each end are suitably scored and the carton when erected and subsequently processed in the machine results in a container which is self-sustaining in shape.

The machine of this invention comprises a console 50 supported on legs 51 and supplied with utilities, such as electric power, heating gas, compressed air and cooling water from appropriate external sources. An operator's control and indicator panel 52 and an emergency stop bar 53 are carried on the forward walls of the console 50. Housed within the console and also arranged on a top portion thereof are the various component mechanisms which operate on the carton, as will be hereinafter described.

Magazine, feeder and loader mechanisms

Figure 1:
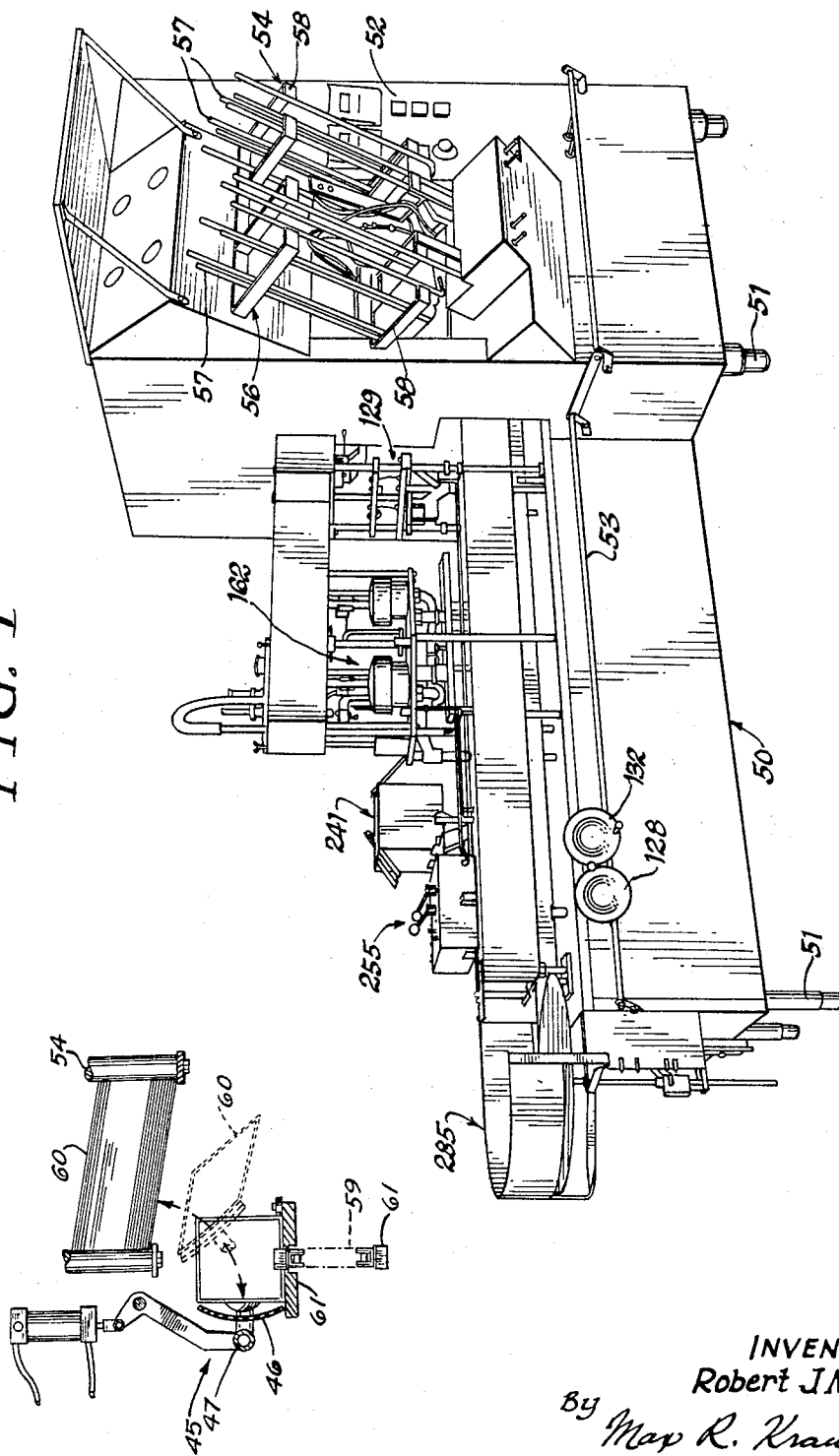
FIG. 1 is a perspective view of a machine embodying the present invention.

Referring particularly to FIG. 1, the machine is provided with a pair of magazines 54 and 56 in juxtaposition, each formed of a plurality of spaced apart guide bars 57 adjustably supported on spaced upper and lower frame members 58. The machine is intended to operate separately on carton blanks having two different base sizes, for example, half-gallon and quart sizes and, accordingly, magazine 56 is adjusted to accommodate half-gallon size carton blanks while magazine 54 is adjusted to accommodate quart size carton blanks. Magazine 54 is provided with additional adjustment means to accommodate one-third quart, pint and half-pint size carton blanks, each of which has the same base size. Each of the magazines is adapted to receive a stack of blanks in collapsed condition, the stack being retained in place by means of suitable stop abutments disposed at the lower end of each magazine. During the course of operation of the machine, blanks are withdrawn successively from the lowermost end of a respective magazine by means of a suitable feeding device and are successively operated on by the various component mechanisms of the machine.

Cooperating with the lowermost end of each magazine 54 is a conventional feeder mechanism 45 which comprises a pivotally mounted gate member 46 carrying a plurality of vacuum pickup cups 47. The gate member swings through an angle of approximately 90° and the cups engage a side panel of the lowermost blank in the magazine. On the return swing the carton blank 60 is erected into open ended tubular form, FIG. 9 (A), whereupon vacuum cups release the carton so that it drops onto a chain conveyor 59 (FIG. 9) carrying dogs 61, one of which engages a rearward edge of the carton blank and moves it up an incline until it telescopes over a registering mandrel 62 which is part of the bottom forming mechanism, indicated generally by the numeral 63.

Bottom forming mechanism

Referring to FIG. 9, the bottom forming mechanism 63 for the quart size and smaller carton blanks comprises an intermittently and rotatably driven mandrel assembly 64 carrying a plurality of radially disposed mandrels 62, in this instance six in number, and a plurality of cooperating station units with which the mandrels are adapted to register sequentially and cooperate during the course of their rotational indexing movement. These stations are a bottom breaker unit 66, a heater unit 67, and a bottom closure and sealing unit 68.

Figure 11:
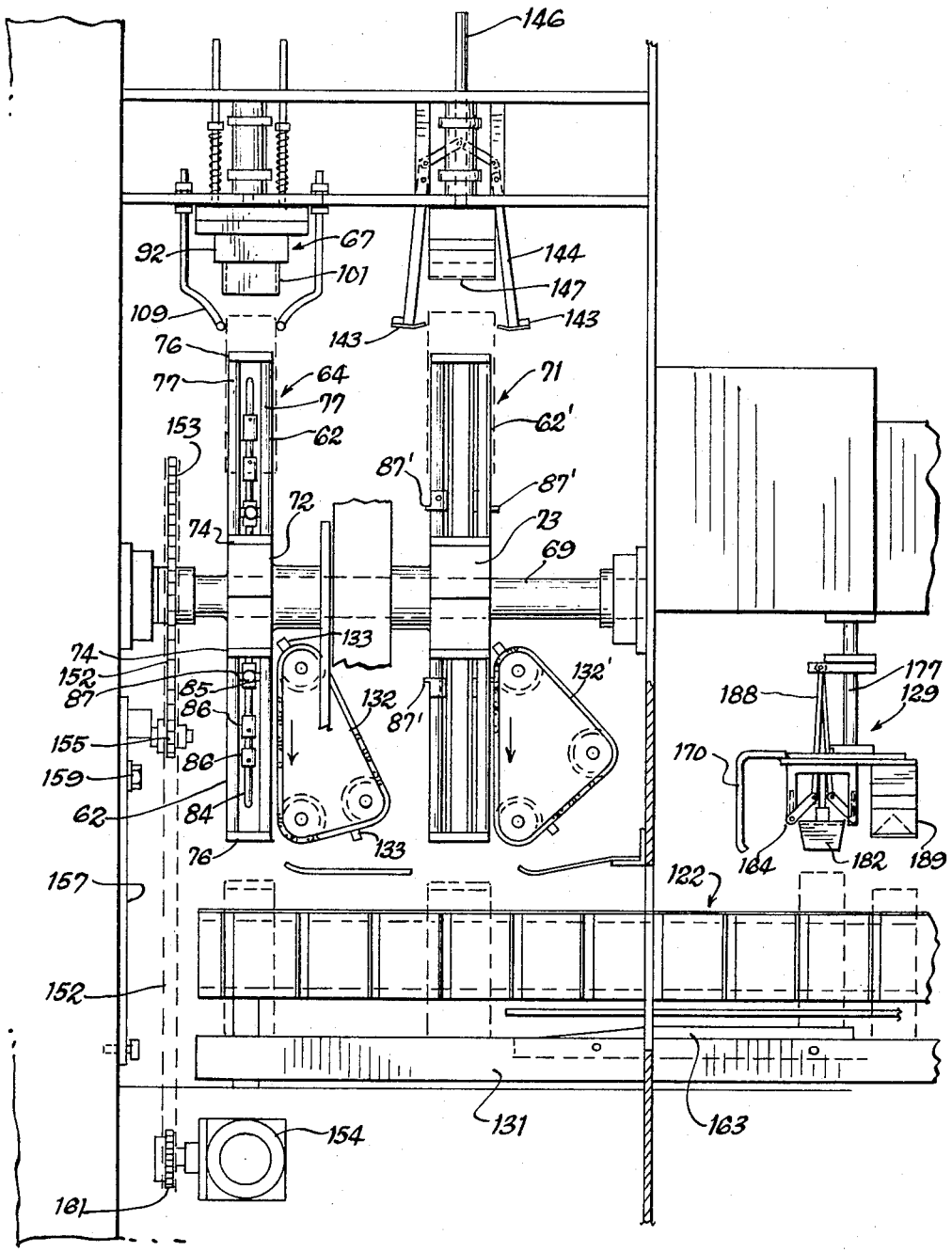
FIG. 11 is a fragmentary rear elevational view showing a portion of the carton forming and conveyer means.

The mandrel assembly 64 comprises a relatively large diameter hollow shaft 69 suitably journaled in the frame of the console 50. Referring to FIG. 11, it will be seen that two mandrel assemblies 64 and 71 are mounted on shaft 69, each spaced so as to be in registration with a respective carton feeding means associated with a respective magazine. Thus, the mandrel assembly 64 is in registration with magazine 54 and the mandrel assembly 71 is in registration with magazine 56.

Intermediate the ends of the shaft 69 are two polygonal portions 72 and 73, each having six faces affording seats to receive the inner end portions of the mandrels. Each mandrel 62 comprises inner and outer square plates 74 and 76 respectively, joined together by four posts 77 disposed at the corners of the plates. The posts have a length somewhat greater than that of the largest size carton which the mandrel is intended to support. The outer plate 76 which constitutes the pressure plate (FIGS. 30, 31) is provided on its inner face with a counterbored circular recess 78 in which is received a circular disk 79 to which are connected a pair of inlet and outlet tubes 81 and 82 respectively, which pass through the inner plate 74 and communicate with the interior of the hollow shaft 69 through which coolant liquid circulates. The disk 79 is maintained in sealing engagement with the walls of the recess 78 by means of an O-ring 83. Water or other suitable coolant is caused to circulate through the pressure plate 76 and affords means for cooling the same.

Since machines of this type may operate in areas where the coolant water may have a high degree of hardness, with the result that calcareous deposits may fill the liquid passages, it becomes necessary to effect frequent cleaning of the passages in order to prevent stoppage of the flow of coolant liquid. As will be apparent, the mandrel 62 may be very readily disassembled to afford access to the ends of the tubes 81 and 82 which may be readily rodded as by a suitable instrument. It will be understood that the outer or pressure plate 76 of each mandrel 62 is square and of a size to fit snugly within the interior of an open ended carton.

Figure 30:
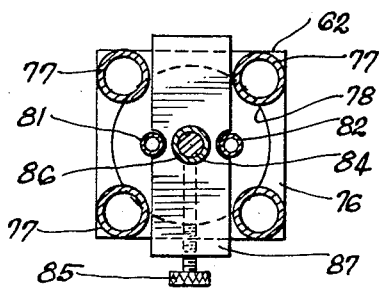
FIG. 30 is an enlarged cross-sectional view taken substantially on line 30—30 of FIG. 9.

Referring to FIGS. 9, 11 and 30, the mandrel 62 intended for use with the smaller base size carton blanks is provided with a center rod 84 secured at its inner end to the inner plate 74 and carrying three sleeves 86, each of which is provided with a set screw to lock the sleeve on the rod in a position of adjustment. A stop member 87 is slidable axially of said sleeve and is provided with a spring loaded detent pin 85 which is adapted to engage in a detent in each sleeve and lock the stop member in a position of adjustment. Each detent is related to a different size carton, for example, quart, one-third quart, pint and half-pint sizes, and the stop member 87 serves to limit the movement of the open ended carton when it is loaded on a mandrel.

Referring to FIG. 9, following the loading of an open ended carton blank 60 on the mandrel 62 by the loader mechanism, the mandrel assembly 64 moves counterclockwise, in the direction of the arrow, through one indexing step wherein the blank 60 is brought into registration with a bottom breaker unit 66 which includes a pair of folder wings 89, illustrated in FIG 9 (B) adjacent the breaker unit 66, and a pair of oppositely disposed rods 91, each operated by a separate air cylinder 90. The breaker unit 66 is operated by an air cylinder 90a.

The bottom breaker unit 66 is adapted to effect substantial prebending of the bottom closure parts of the carton blank on their respective score lines and toward their closed position, to the extent that there is a permanent set in the paperboard and its thermoplastic coating. The relationship of the closure parts after prebending is illustrated in FIG. 9 (B).

Following the bottom breaking operation, the mandrel assembly 64 indexes the carton blank around to the heater unit 67 which is caused to be moved into registration with the closure parts of the carton blank, as will be presently explained. Referring more particularly to FIGS. 15 through 19, the heater unit 67 comprises a plenum chamber 92 rigidly fixed to the piston rod 93 of an air cylinder 94 and having an inlet opening 96 connected to a combustion chamber, not shown. The combustion chamber includes an appropriate gas burner, air supply, and igniter and is adapted to deliver a blast of heated air to the plenum chamber 92 at a temperature of about 850° F. This blast of air impinges on a baffle plate 97 disposed within the plenum chamber 92 before passing out through the apertures 98 in the bottom wall 99.

Removably attached to said bottom wall is a heater head 101 which includes a center element 102 formed of suitable sheet metal and shaped substantially as illustrated in FIG. 19. The walls of element 102 are perforated according to a desired pattern to provide discharge apertures 100 so that heated air passing therethrough will impinge on predetermined areas of the carton closure parts to activate the thermoplastic coating thereon. The heater head 101 also includes two outer elements 103 formed substantially as illustrated in FIG. 18 and arranged in spaced relation to opposite ends of the center element 102, as illustrated in FIGS. 15 and 17. The outer elements 103 similarly are perforated to provide a desired pattern of discharge apertures 105. Referring to FIG. 19, it will be seen that each of the corner portions of the center element 102 are slotted as at 106 in contrast to the planar surfaces which are perforated. As will be seen clearly in FIG. 15, heated air passes from the plenum chamber 92 into the heater head elements 102 and 103 and is discharged through the apertures 100, 105 and slots 106.

When the carton blank 60 is indexed to register with the heater unit 67 the air cylinder 94 is actuated to move the heater unit 67 in the direction of the carton blank 60 so that the center element 102 enters the open end and the carton closure parts are disposed in the spaces between the center and outer elements 102 and 103, 104 respectively. A pair of plates 107 is provided at opposite sides of the heater head 101 to completely enclose the center element 102. Thus, the opposite closure parts of the carton are received in the spaces between the flat faces of the center element 102 and the outer plates 107. As seen clearly in FIG. 15, during the heating interval all of the bottom closure parts are substantially completely embraced on all four sides by the heater head 101. Referring to FIG. 17, it will be seen that jets of heated air are caused to be discharged from the center element 102 and to impinge on all inner surfaces of the closure parts desired to be heated, while only the outer surfaces of the inwardly folded closure parts are heated by jets of air from the outer elements 103 and 104.

After the heating interval the air cylinder 94 is retracted and the heater unit 67 is caused to be withdrawn from the end of the carton blank substantially to the position illustrated in FIG. 9. The mandrel assembly 64 is then caused to index and to carry the blank to the next station which comprises the bottom closing unit 68.

In the event of a temporary stoppage of the machine due to some emergency or jamming, provision is made for preventing thermal injury to the carton blank which is in close proximity to the heater head 101. Referring to FIG. 9, there is shown a nozzle 108 disposed at a point substantially at the level of the lower end of the heater head 101 when the same is in retracted non-operative position. The nozzle 108 is connected to a source of compressed air and is controlled by a valve, not shown, which is automatically actuated upon stoppage of the machine to cause the nozzle 108 to direct a blast of cooling air between the heater head 101 and the carton, thereby to deflect heat away from the carton blank. It will also be noted that upon stoppage of the machine the air cylinder 94 automatically is caused to be retracted and to draw the heater unit 67 to retracted nonoperative position and away from close proximity to the carton. The flow of heated air discharged from the heater head 101 is not reduced or modified but is maintained at normal operating level during such stoppage. It has been found that even if the machine were to be shut down for periods of one-half hour or more no fire could occur, the only damage resulting being slight charring of the edges of a carton at the heating station.

When the carton is caused to be indexed to the bottom closing station 68, the coating on the closure parts has been heated to a temperature sufficient to activate the adhesive action of the coating and in such condition the coating will adhere to itself and to complementary hot surfaces.

Referring to FIGS. 9 and 11, a pair of lead-in guide members 109 are arranged, one on each side of the mandrel assembly 64, said guide members being shaped so as to engage the closure parts of the carton and fold them into overlapping relation, as the carton enters the bottom closing station. The relationship of the closure parts is illustrated in FIG. 9 (C).

The bottom closure unit 68 comprises an air cylinder 111 having a piston rod 112 on the end of which is mounted a pressure pad 113 adapted to engage the closure parts and to seal the same. The surface of the pressure pad 113 (FIG. 32) is provided with a plurality of embossments 114 adapted to form dams 116 on the carton closure parts to effect transverse sealing of certain of the seams of the carton. Referring to FIG. 31, it will be seen that the outermost closure part 60a in moving to the bottom closure unit 68, because of the normal resilience of the paperboard, would tend to scrape against the embossments 114 which might injure the appearance of the carton. Accordingly, the face of the pressure pad 113 is provided with a recess 117, substantially centrally thereof, in which is received a guard member 118 mounted on pins 119 slidable in apertures provided in the pad. It will be seen that when the pressure pad 113 is retracted, as illustrated in FIG. 31, the inner ends of the pins 119 tend to bear on the end block 121 of the air cylinder 111 and maintain the guard member 118 in projected position, away from the surface plane of the pressure pad 113 so that the guard member 118 engages the closure part 60a and prevents contact of the embossments 114 with said closure part. When the air cylinder 111 is actuated, the piston rod 112 moves the pressure pad 113 toward the mandrel plate 76, permitting the guard member 118 to be retracted within the recess 117 and affording a uniformly solid outer surface over the pressure pad which presses against the carton bottom. As the pressure pad 114 is retracted from the sealed carton bottom the pins 119 again are caused to engage the end block 121 and to project the guard member 118 outwardly so as to be in condition to be engaged by the closure part 60a of the next carton to be operated upon.

The bottom of the carton is now sealed and closed, as shown in FIG. 9 (D), and the mandrel assembly 64 indexes through another step and carries the carton to a station having no operative unit. This merely affords an additional interval for cooling of the activated adhesive, since the closed bottom is in intimate engagement with the mandrel plate 76 which is cooled by a circulating coolant.

In the final indexing position of the mandrel assembly 64 the mandrel 62 is disposed in vertical registration with a conveyor 122, illustrated more particularly in FIGS. 3, 9 and 11. A guard member 120 prevents the carton from falling off of the mandrel.

Stripper

Referring to FIG. 11, a carton stripper in the form of an endless chain 132 suitably mounted and carrying spaced dogs 133 is arranged with a vertical reach of the chain in parallel relation to one side of the carton when the same is disposed in registration with the conveyor 122. In timed relation with the operation of the mandrel assembly 64 a dog 133 is carried into position to engage one upper edge of the top closure part of the carton and in moving downwardly strips the carton from the mandrel 62 so that the carton drops onto the conveyor 122.

The conveyor comprises a pair of endless chain assemblies 123 and 124 driven by sprockets 126 and arranged in spaced parallel relation (FIG. 3). The chain assemblies carry carton engaging dogs 127 longitudinally spaced and arranged in transverse registration, as seen clearly in FIG. 3. Screw means controlled by a crank wheel 128 (FIG. 1) are provided for varying the distance between the inner reaches of the chain assemblies 123 and 124 so as to accommodate cartons having different base sizes. The conveyor 122 transports the cartons to the top breaker mechanism 129, hereinafter to be described.

In such transport the carton 60 is snugly embraced by the conveyer 122 and is maintained in erect position with the base of the carton sliding over a rail 131 which is vertically adjustable as by crank wheel 132 to accommodate cartons of different heights. Thus, for example, a maximum width and height are required to accommodate cartons of half-gallon size, while a lesser width and height are required to accommodate cartons of quart and half-pint sizes.

As was hereinabove noted, the machine is capable of separate operation on cartons having two different base sizes, for example, quart and half-gallon sizes. Referring to FIGS. 10 and 11, a mandrel assembly 71, similar to that described and illustrated in FIG. 9, is carried on the main drive shaft 69 in spaced relation to the mandrel assembly 64. The mandrel assembly 71 is intended for processing half-gallon sizes. Said mandrel assembly, of course, is disposed in operative registration with the corresponding magazine and carton loading mechanism. While the mandrel assemblies 64 and 71 are similar, except for size, corresponding parts being identified by corresponding primed numerals, the operative units intended to process the half-gallon size cartons 60′ and sequence of operations are somewhat different from those operable on the quart and related sizes of cartons. As will be clearly seen by reference to FIGS. 9 and 10, the half-gallon size cartons 60′ are fed onto the mandrels 62′ in the same manner but in a position rotated 90°, FIG. 10 (A), from the corresponding position of the quart size cartons. Sleeves 87′ adjustably carried on posts 77′ afford stops to limit movement of the carton on the mandrel 62′. After loading, the mandrel assembly 71 indexes the carton to the first position where a heater unit 134 is located. The heater unit 134 is similar to heater unit 67 but the form of the heater head 136 is modified, as illustrated in FIG. 17a to accommodate the bottom closure parts of the carton which have not as yet been operated upon by any breaker mechanism. As will be noted, the heater head 136 affords a square-shaped formation for receiving the bottom closure parts of the carton. Here too, the discharge apertures of the center and outer heater elements 137 and 138 respectively, are arranged according to a prescribed pattern so as to heat only the areas of the closure parts which are intended to be adhesively secured together. The heater unit 134 similarly is operated by an air cylinder 139 which is so constructed that in the event of stoppage of the machine, the heater unit is retracted from the carton to prevent thermal injury to the same. There is also provided a nozzle 141 arranged to project a stream of air between the heater head 136 and the carton top to divert heated air away from the carton, as in the first described embodiment.

Following heating, the carton is then indexed to the breaker station where the breaker assembly 142 (FIGS. 10, 28 and 29) effects substantial prebending of the bottom closure parts on their respective score lines and toward their closed position. The breaker assembly 142 includes a pair of substantially triangular breaker elements 143, each carried on the end of a pivoted lever 144 connected by linkage to an actuating rod 146.

Figure 28:
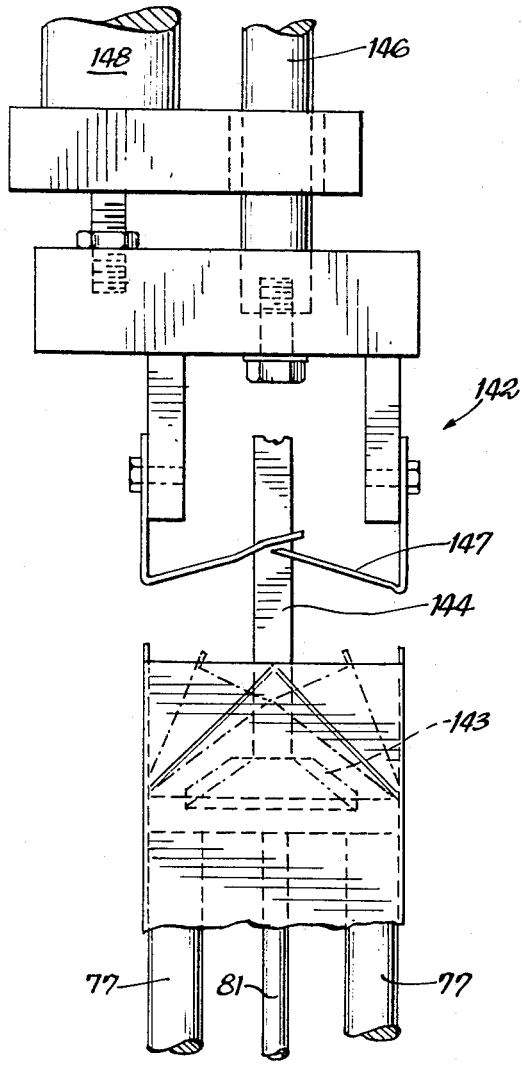
FIGS. 28 and 29 are, respectively, enlarged fragmentary elevational and cross-sectional views showing the bottom breaker for the half-gallon size cartons, and detailing the manner in which the bottom closing unit tucks and closes the bottom closure parts of the carton.
Figure 29:
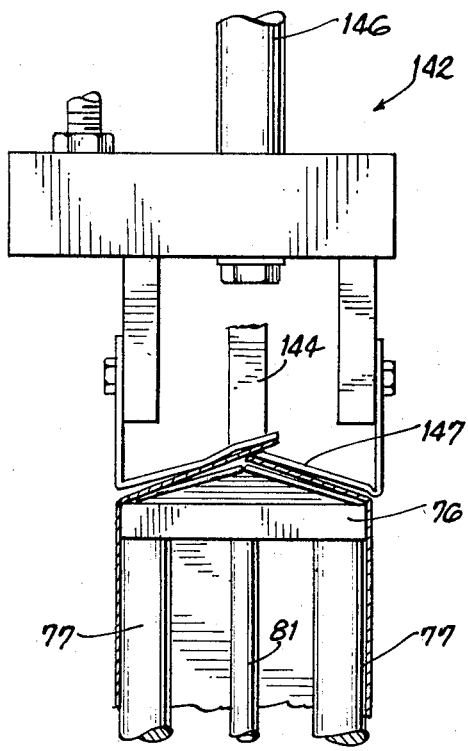

In operation, the breaker elements 143 are caused to swing inwardly and impinge on the scored closure parts of the carton to effect breaking of the same along the scored lines to the form illustrated in FIG. 10 (B). Concurrently, folding elements 147 operatively connected to the piston rod of an air cylinder 148 engage the closure parts, as illustrated in FIGS. 28 and 29 to effect overlapping of the closure parts, as illustrated in FIG. 29 and FIG. 10 (C). As the carton indexes to the next station, the uppermost closure part wipes against an arcuate retaining member 149 which serves to maintain the overlapping closure parts in proper folded relation so that they may be acted upon by the bottom closure unit 151. The bottom closure unit 151 is similar to the closure unit 68, hereinbefore described, except that it does not have a retractable guard like guard 118 in the pressure pad. The pressure pad acts against the carton closure parts to effect closing and sealing of the same, as in the first instance, FIG. 10 (D), (E). The carton is then caused to be indexed two stations to the conveyer 122 and stripped from the mandrel by a stripper 132′. A rail 150 is provided to prevent inadvertent separation of the carton from the mandrel 62′.

Conveyer

It will be apparent that because of the differences in the dimensions of the bases of the half-gallon and quart size cartons the timing of the conveyer 122 must be adjusted in order to effect proper registration of the respective cartons with the top breaker and filler units 129 and 162, hereinafter to be described. Referring to FIGS. 9 and 11, the conveyer 122 is driven by a sprocket chain 152 driven by a sprocket wheel 153 fixed on the main drive shaft 69. Through a suitable gear train 154 power is transmitted to the conveyer 122. The sprocket wheel 153 is of relatively large diameter and both reaches of the chain 152 travel over respective idler sprocket wheels 155 and 156 which are mounted on a pivotally supported member 157. Said member is rockably adjustable and is provided with an arcuate slot 158 through which extends a bolt 159 for locking the member in a position of adjustment. The member 157 preferably is provided with a suitable handle, not shown, for effecting easy rocking of the same. It will be seen that as member 157 is rocked in a counterclockwise direction, as viewed in FIG. 9, in view of the rotation of the main drive shaft 69 and sprocket wheel 153, as indicated by the arrow, the driven sprocket 161 connected to gear train 154 will be caused to rotate a fractional turn in a counterclockwise direction, thereby effecting a corresponding movement of the conveyer 122 and effecting an advancement of the position of the carton in the direction of its movement. Adjustment of the member 157 in a clockwise direction will effect a rocking movement of the driven sprocket 161 in a clockwise direction with a corresponding retardation of the position of the conveyer and the carton being moved thereby. Thus, the indexing position of the conveyer 122 may be readily adjusted to accommodate different sizes of cartons so that the conveyer 122 operates in accurate alinement and synchronism with the breaker and filler mechanisms.

*Top breaker mechanism*

Referring to FIGS. 8, 11, 12 and 13, it will be seen that the top breaker mechanism 129 is disposed in registration with the path of travel of the cartons as they are moved forwardly along the rail 131 by the conveyer 122. As seen in FIG. 11, the rail 131 is provided at the sides with a pair of platform members 163 having a sloping lead portion so that the cartons may be moved onto the platform members 163 and moved thereover at a somewhat elevated position above the surface of the rail 131. This elevation affords the necessary clearance for the operation of the top breaker mechanism 129, which will be presently described.

Referring particularly to FIGS. 8, 12 and 13, a pair of lift rods 166, each connected to a crank 167 carried on a shaft 168 are operatively driven by a drive shaft 169 synchronized in operation with the main drive shaft, not shown, of the machine. Rotation of the crank arms 167 effects reciprocating movement of the lift rods 166 in a vertical direction. A transverse bar member 171 is pinned to the lift rods 166 to move therewith. A cross-head member 172 is disposed substantially in parallel arrangement to the bar member 171 and is arranged to be slidable relative to said lift rods. Each end of the cross-head 172 is supported on a flanged sleeve 173 which rests on a spring 174 supported on a collar 176 pinned to each of the lift rods. A rod 177 is secured at its lower end to the center of the cross-head 172 and passes through an aperture in the bar member 171 and through a registering aperture in a frame member 178. A nut 179 on the end of the rod 177 retains a resilient shock absorbing member 181 which is adapted to engage against the frame member 178 and to limit the movement of the cross-head 172 in a downward direction.

Secured to and depending from the cross-head 172 is a breaker element 182 in the form of an inverted truncated pyramid which is adapted to enter the open end of the carton. Also depending from the cross-head 172 are a pair of inverted substantially U-shaped brackets 183 in the lower ends of which are journaled a pair of shafts 184, to each of which is affixed a substantially triangular breaker element 186. A crank arm 187 is attached to the end of each shaft 184 and the free ends of said crank arms are connected to links 188 which are pivotally connected to the bar member 171. As the lift rods 166 are caused to move downwardly by their respective cranks 167 the breaker element 182 is caused to enter the carton in registration therewith, as hereinabove explained, so that the base of the breaker element 182 is in registration with the score line at the juncture of the closure parts and the body of the carton. This represents the limit of movement for the cross-head 172, since at that point the resilient member 181 moves into abutment with the frame 178 arresting the downward movement of the cross-head 172. However, the lift rods 166 and bar member 171 pinned thereto continue to move in a downwardly direction relative to the cross-head 172, with the result that the links 188 actuate the cranks 187, causing the breaker elements 186 to rock inwardly towards each other, approximately 45° from the vertical, so as to prebend the top closure parts along their various score lines. As the crank arms 167 continue to rotate, the breaker elements return to vertical position and the cross-head 172 is caused to be elevated by the sleeve 173, whereby the breaker element 182 is drawn out of the carton and the breaker elements 186 are caused to return to the non-operative position illustrated in FIGS. 12 and 13.

In the event that a carton becomes misalined as it is being moved by the conveyer 122, an arm 170 rigidly mounted on cross-head 172 is caused to enter the carton immediately behind the carton being operated on by the breaker unit and serves to realine the carton, so as to prevent accidental crushing by any part of the breaker unit 129 in its downward movements.

Also depending from the cross-head 172 is a breaker unit in the form of a plate 189 having an inverted V-shaped notch 191 opening downwardly, and a pair of plates 192 in generally inverted Y-formation, arranged as illustrated in FIGS. 12 and 13. In the next indexing position of the conveyer the carton which is held snugly by the conveyer chains is pushed downwardly back onto the rail 131 (FIG. 12), and as the cross-head 172 is caused to move downwardly, the plate 189 engages the prebent closure parts to effect further breaking while the inverted Y plates 192 engage the opposite closure parts of the closure. As a result of the foregoing action, the top closure parts of the carton are prefolded inwardly to the form approximating that shown in FIG. 14.

The platform members 163 afford means for elevating the carton above the normal position on the rail 131 so as to afford the necessary clearance for the operation of the top breaker unit 129 in its downward movement in relation to the conveyer 122.

*Filler unit*

The filler unit 162 comprises a supply tank 193 adapted to contain a supply of milk or other liquid to be packaged in the cartons processed by the machine. A supply line 194 delivers milk from a larger supply source. The filler unit includes two filler heads 196 and 197 which are identical, each head being mounted in overlying relation with a corresponding carton supported on the rail 131 and movable by the conveyer 122. Each filler head supplies substantially one-half of the liquid contents of the carton as it passes successively under each filler head.

Each filler head 196, 197 includes a piston-type pump 198 having a relatively large diameter cylinder, the stroke of each pump being adjustable, as will be hereinafter explained. Each pump 198 is connected by a separate conduit to the supply tank 193. Since the pumps and their operating mechanisms are substantially identical, only one of the pumps and its mechanism will be described.

Referring to FIGS. 8 and 20, the drive shaft 199 for the pumps 198 is suitably journaled in the frame of the machine and is offset from the shaft 169 but is connected thereto by a drag link mechanism 201, illustrated in FIG. 8. Accordingly, while the shaft 169 is rotated at a uniform speed, the shaft 199 for a portion of each rotation is caused to rotate at a higher rate of speed than the balance of the rotation. This action is utilized in the operation of the pump 196 so that the suction stroke of the piston is more rapid than the discharge stroke. In other words, the discharge interval for the pump is greater than the suction interval. The provision of an extended interval of time for filling the carton results in reducing foaming of the liquid discharged into the carton.

Referring to FIG. 20, mounted on the shaft 199 is an eccentric strap 202 carrying an eccentric rod 203. The free end of said rod is slidable in a sleeve 204 provided with registering longitudinally extending slots 206. The rod 203 is pierced to receive a pin 205 which projects through the rod 203 and through the slots 206 on opposite sides, as seen clearly in FIG. 23. As will be apparent, the rod 203 may move relative to the sleeve 204 within the limits of the length of the slot 206. The upper end of the sleeve 204 is pinned to a lift rod 207 connected to an adjustable pump lever 208, hereinafter to be described. The sleeve 204 is provided with a lateral boss 209 mounting an air cylinder 211 operatively connected to a pin 212 slidable in a bore in the boss. The upper end of the eccentric rod 203 is provided with a drilled hole 213 arranged to receive the pin 212, as will be hereinafter explained.

Referring to FIGS. 7 and 20, carton sensing means in the form of two trip levers 214 and 216, each rockable about a vertical axis, are provided in close proximity to respective filler heads 196 and 197. The levers 214 and 216 extend over the conveyer 122 and project into the path of travel of the cartons moving toward the filler unit. Each lever 214, 216 is operatively connected to a separate valve control, not shown, for a respective air cylinder 211. In nonoperative position the pin 212 is normally retracted from the hole 213 in the eccentric rod 203 and said rod may move relative to the sleeve 204 without imparting any reciprocatory motion to the lift rod 207. However, when a carton engages the lever 214, 216, the respective air cylinder 211 is actuated to project the pin 212 through the hole 213 in the eccentric rod 203, thereby locking the sleeve 204 to the rod 203, whereby reciprocatory motion is transmitted to the lift rod 207 to effect operation of the pump through one cycle of operation. This results in a measured quantity of liquid from the filler head being discharged into an underlying carton.

As a carton moves out of engagement with a trip lever 214, 216, the air cylinder 211 effects rapid withdrawal of the pin 212 to render the pump inoperative. It will be understood, however, that no matter at which point the pin 212 is retracted, the pump will always complete a full suction stroke, since the pin 205 will engage against the lower end of slots 206 and draw the lift rod 207 downwardly, thereby rocking the lever 208 to effect a suction stroke of the pump.

Each filler head 196, 197 is so designed that the liquid entering the carton tends to spread out and follow the interior walls of the carton, with the result that the air in the carton is discharged centrally upwardly from the carton.

The arrangement above described affords a safety means to prevent discharge of liquid from a filler head in the event that no carton is in position to move into filling position beneath a filler head. If a trip lever 214 or 216 is not engaged by a carton, pin 212 is not caused to be actuated and the lift rod 207 is not actuated to operate the pump.

Referring to FIGS. 20–22, the adjustable lever 208 affords means for varying the stroke of the piston of pump 198, thereby to vary the quantity of liquid which is delivered by the pump. The piston rod 217 of the pump 198 is connected by means of a link 218 to a threaded rod 219 which is provided with two elongated transverse slots 221 and 222. The threaded rod 219 carries three collars 223, 224 and 225 cooperating with said rod, the collars being adjustable longitudinally of the rod. Each of the collars 223 and 224 is provided with one transverse aperture, while the collar 225 is provided with two spaced transverse apertures. As will be seen in FIGS. 21 and 22, the rod and collar assembly are disposed between a pair of parallel support members 231 which have four sets of registering apertures 230 to receive a pin 232, also adapted to pass through one of the apertures in a collar and through a registering slot of the threaded rod 219. Carried on the rearward end of the threaded rod 219 is a threaded collar 232 provided with an annular recess to receive a strap 233 hingedly connected to the lift rod 207. The collar 232 is provided with a knurled head 234 and with a detent pin 236 for effecting locking of the collar in a position of adjustment.

Each of the transverse apertures of the collars 223–225 in combination with a respective aperture 230 in the support members 231 constitutes a different fulcrum position for the operating lever 208 of the pump 198, so as to vary the stroke of the piston thereof. For example, in the position illustrated in FIG. 20 where the fulcrum is located at a point most remote from the piston rod 217, the pump 198 is adjusted to deliver substantially one quart of milk for filling a half-gallon carton. Successively, the fulcrum positions moving from left to right are employed for filling quart, one-third quart, and pint sizes of cartons respectively. In each case only substantially one-half of the quantity of liquid will be delivered by a filler head with each operation of the pump 198. It will be understood that the relative positions of the several collars 223–225 are initially determined by trial and error and the collars then are locked in position by suitable set screws. Correspondingly, the position of apertures 230 are similarly determined.

As various sizes of cartons are required to be filled by the machine, the fulcrum position for the lever 208 is changed by removing the pin 232 from one position and placing it into another position. The sleeve 232 affords a micrometer adjustment of the pump piston travel for calibration of the volume of liquid delivered by the pump. Adjustment of the volume of liquid discharged by the pump is sometimes required as the character of the liquid changes during an operational period of the machine. It will be seen that an adjustment may be readily effected by an operator without the necessity of stopping the machine.

As will be seen by reference to FIG. 7, the micrometer adjustment feature is eliminated at the first filler head 196, since the purpose of this head is merely to deliver approximately one-half the final quantity of liquid discharged into the carton. At the final filling station or at filler head 197, accuracy of volume, of course, is essential, and the quantity of liquid that is to be discharged into the carton below the head must be accurately controlled.

The use of two filler heads operating concurrently, the first delivering substantially one-half of the liquid to the carton and the second completing the filling of an already half filled carton, results in a very substantial reduction in filling time, since only one-half of the contents need be discharged into the carton at the final filling station. This results in a higher rate of production of the machine, as well as reducing the tendency of the liquid to foam during the filling operations.

At the next station immediately following the filler head 197, a defoaming unit in the form of a tube 237 mounted for vertical reciprocation is caused to enter the mouth of an underlying carton and to evacuate any foam that may be present. The tube 237 is connected by means of a flexible conduit 238 to the top of the supply tank 193 which is connected by means of another conduit 239 to an evacuating system, not shown.

*Closing and sealing mechanism*

The top heater unit 241, illustrated in FIGS. 7 and 24 through 27, is adapted to prepare the top closure parts of the filled carton for heat sealing by causing adhesive activation of the thermoplastic coating. The heater unit 241 comprises a plenum chamber 242 directly connected to a combustion chamber 243 provided with an ignition means 245 and in communication with a source of supply of heating gas, as in heater unit 67 utilized for heating the closure parts of the bottom of the carton. Heated air is directed into the plenum chamber 242 and passes out through heater head 244, which is similar in construction to the heater head 101 hereinbefore described. The heater head 244 includes a center heating element 246 and end elements 247 which are hollow and are provided with a series of discharge apertures which are arranged, according to a predetermined pattern, to direct heated air specifically to the areas which are to be adhesively activated.

The heater unit 241 overlies the path of travel of the filled cartons moving on the rail 131 and is supported on a pair of lift rods 248 which are suitably supported for vertical reciprocatory movement. A cross-head 249 is rigidly connected to the rods 248 and a cam 251 fixed on the shaft 199 operatively engages the cross-head 249 and effects vertical reciprocation of the heater unit in synchronism with the operation of the other components of the machine. Referring to FIGS. 24 and 25, it will be seen that the heater unit 241 is caused to move downwardly so that the top closure parts of the carton 60 are received between the center heating element 246 and a pair of guide rods 253 carried on the frame. FIG. 25 shows the position of the opposite carton closure parts which are received between the angular faces of the center and end heating elements 246 and 247 respectively. The prebroken top closure parts are heated both on the inside and outside surfaces (FIG. 25) while the unbroken closure parts are heated only on the inside surfaces (FIG. 24). The temperature of the heated air discharged from the heater head is very accurately controlled so that uniform results are obtained in the heating operation.

As will be seen by reference to FIGS. 24 and 25, the heater head 244 is removably mounted in slots provided in the bottom of the plenum chamber 242 so that it may be easily removed for cleaning or for changing to other sizes.

An air cylinder 254 is mounted on the frame of the machine and is connected to the cross-head. Upon stoppage of the machine the air cylinder 254 is automatically actuated to elevate the heater unit 241 to a safe position above the carton so that no thermal damage to the carton can occur. Upon the resumption of the operation of the machine the air cylinder 254 is deactivated and the heater unit 241 returns to normal operation.

The top closure and sealer unit, indicated generally by the numeral 255, is mounted on a pair of supporting columns 256 on top of the console 50 with the pressure jaws, hereinafter to be described, disposed in overlying relation to the path of travel of the carton. Referring to FIGS. 36 and 37, two sets of pressure jaws 257 and 258 are provided for effecting two successive applications of pressure in order to insure positive sealing of the top closure parts of the carton. Referring to FIG. 37, the first set of pressure jaws 257 are shaped in plan substantially as illustrated, with the leading ends fanned outwardly to provide a lead-in for the top lips of the carton. The jaws 257 converge in the direction of movement of the carton and are shaped to cam against the roof of the carton so as to bring the top lips into accurate registration with each other, as illustrated in FIG. 35. The inner jaw 257a is fixedly secured to a member 255a which is bolted to the end block 260 of an air cylinder 262. The outer jaw 257b is rigidly mounted on a member 255b carried on the piston rod 261 of air cylinder 262 which is adjustably secured to the plate 259 by screw means. A pair of screw members 263 in threaded engagement with the end vertical plate 264 are swivably connected to the end block 266 of air cylinder 262 and afford means for adjusting the position of the air cylinder 262 and correspondingly the jaws 257, both longitudinally and angularly of the axes of the screws 263. Knurled handles 263a on the ends of the screws 263 afford means for easy adjustment. A pair of screw members 267, each provided with a handle 268 pass through respective enlarged apertures 269 in the top supporting plate 259. Said screw members are in threaded engagement with the end blocks 260 and 266 and afford means for locking the air cylinder 262 in a position of adjustment.

Adjustment of the jaws 257 may be required from time to time in order to effect proper alinement of the top sealing lips so that they are in proper registration, both for effective sealing and good appearance of the finished carton. As will be apparent, adjustment may be easily effected even while the machine is in operation, thereby avoiding the necessity for shutting down the machine for extended periods of time as in prior art machines.

The second set of pressure jaws 258 are disposed immediately adjacent the first set of jaws 257 and, as will be seen clearly in FIG. 37, these jaws have parallel faces for engaging the top sealing lips of the carton which have already been pressed together. The jaws 258 may carry dating indicia for impression on the sealed lips of the carton. Similarly as with the first set of jaws 257, the inner jaw 258a is stationary, being secured to the end block 271 of an air cylinder 272, while the outer jaw is connected to the piston rod 273 of the air cylinder 271 which is mounted in generally parallel relation to air cylinder 262. Air cylinder 271 is secured to plate member 259 by bolts 275.

Each of the air cylinders is connected to a separate air switch 276 and 277 respectively, mounted on the frame of the machine and adapted to be engaged by a cam 278 fixed on shaft 199. As the cam 278 is caused to engage the respective air switches in timed relation with the movement of the cartons, the top lips of a carton are compressed first between the first set of jaws 257 and then as the carton moves to the next station; the second set of jaws 258 are rendered operative to effect a second application of pressure to the top lips of the carton. The jaws 257 and 258 may be suitably cooled by a coolant medium which may be circulated through the unit.

Each of the jaws 257 and 258 is provided with a longitudinally extending recess adapted to receive a cooperating projection on their respective supporting members. The jaws are secured by screw means which are readily accessible, in the event removal of the jaws becomes necessary as for cleaning purposes.

After final sealing, the filled completed cartons move onto a rotatable platform unit 285 from which they are taken by an operator and placed in suitable containers for shipment.

It will be understood that various changes and modifications may be made from the foregoing without departing from the spirit and scope of the appended claims.

What is claimed is:

1. A machine for forming cartons of paperboard or the like from blanks having a thermoplastic moisture-proof coating on their inner and outer surfaces and score lines therein defining top and bottom closure parts, said machine comprising in combination a pair of magazines, each adapted to hold a supply of said blanks, a pair of mandrel assemblies coaxially disposed and rotatably driven with a step by step indexing motion, each mandrel assembly being associated with a respective magazine, means associated with each of said magazines for feeding blanks successively from said magazines to an associated mandrel assembly and for erecting said blanks into open ended tubular form as an incident to such feeding, means defining a plurality of stations with which each mandrel assembly is adapted to register for breaking the folds of the bottom closure parts, heating the same for activating the thermoplastic thereon and closing and sealing said bottom closure parts, a single endless conveyor means, means associated with each of said mandrel assemblies for delivering partially formed cartons from said mandrel assemblies to said conveyor means, said conveyor means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, and delivery means for discharging the filled and sealed cartons from the machine.

2. The invention as defined in claim 1 in which each mandrel assembly is separately adapted to operate on a different size of carton and the conveyor means is adjustable to accommodate said different sizes of cartons.

3. A machine for forming cartons of paperboard or the like from blanks having a thermoplastic moisture-proof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, conveyor means comprising a pair of endless chain assemblies arranged in spaced parallel relation, said chain assemblies being adjustable laterally to accommodate cartons of different base sizes between the inner reaches of said assemblies, means for stripping cartons successively from said mandrel assembly in upright position and transferring said cartons to said conveyer means, said conveyer means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, and delivery means for discharging the filled and sealed cartons from the machine.

4. The invention as defined in claim 2, including means for adjusting the drive means for said conveyor so as to advance or retard the positions of the different size cartons moved by said conveyor whereby to effect registration of said cartons with said top breaker, filler, heater and top closure means.

5. A machine for forming cartons of paperboard or the like from blanks having a thermoplastic moistureproof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, the station for closing and sealing the bottom closure parts comprising a movable pressure pad having a recess in the outer face thereof and a guard member supported for movement in and out of said recess, said guard member when said pressure pad is inoperative being adapted to extend beyond the plane of the face of said pressure pad to wipingly engage the outermost bottom closure parts as said cartons are indexed to said station thereby to maintain said closure parts out of contact with the face of said pressure pad, said guard being retracted within said recess upon the application of pressure by said pressure pad, conveyor means, means for stripping cartons successively from said mandrel assembly in upright position and transferring said cartons to said conveyor means, said conveyor means being adapted for moving said blanks as partially formed cartons linearly with a step by step indexing motion successively into registration with top breaker means, filler means, heating means for heating the top closurer parts of the carton blanks to adhesively activate the thermoplastic coating and top closure means, and delivery means for discharging the filled and sealed cartons from the machine.

6. A machine for forming cartons of paperboard or the like from blanks having a thermoplastic moistureproof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, conveyor means, adjustable drive means for said conveyor means for advancing or retarding the positions of carton blanks in their direction of movement, said means including a driving sprocket wheel, a driven sprocket wheel operatively connected to said conveyor means, an endless sprocket chain looped around said sprocket wheels, a pivotally mounted member, a pair of sprocket wheels mounted on said member in spaced relation so that each sprocket wheel engages an opposite reach of said chain, said member when rocked in one direction advancing the position of carton blanks being moved by said conveyor, and said member when rocked in an opposite direction retarding the position of carton blanks being moved by said conveyor means, means for stripping cartons successively from said mandrel assembly in upright position and transferring said cartons to said conveyor means, said conveyor means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, and delivery means for discharging the filled and sealed cartons from the machine.

7. A machine for forming cartons of paperboard or the like from blanks having a thermoplastic moistureproof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, conveyor means, means for stripping cartons successively from said mandrel assembly in upright poistion and transferring said cartons to said conveyor means, said conveyor means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, said top closure means including an air cylinder and a pair of jaws arranged to engage opposite sides of the sealing lips of the top closure parts of a carton, one of said jaws being fixed to one end wall of said air cylinder and the other of said jaws being fixed to the piston rod of said air cylinder and being movable in directions toward and away from said first mentioned jaw, support means for said air cylinder, means for adjustably securing said air cylinder to said support means, means for adjusting the position of said air cylinder and said jaws relative to said support means so as to effect proper alinement of the top closure parts of said cartons with said jaws, said adjusting means and said securing means being easily accessible and operable even while the machine is in operation, and delivery means for discharging the filled and sealed cartons from the machine.

8. A machine for forming cartons of paperboard or the like from blanks having a thermoplastic moistureproof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, conveyer means, means for stripping cartons successively from said mandrel assembly in upright position and transferring said cartons to said conveyer means, said conveyer means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, said top closure means including an air cylinder and a pair of jaws arranged to engage opposite sides of the sealing lips of the top closure parts of cartons, one of said jaws being fixed to one end wall of said air cylinder and the other of said jaws being fixed to the piston rod of said air cylinder and being movable in directions toward and away from said first mentioned jaw, support means for said air cylinder, securing means for adjustably securing said air cylinder to said support means, means for adjusting the position of said air cylinder and said jaws relative to said support means so as to effect proper alinement of the top closure parts of cartons with said jaws, said adjusting means comprising a pair of spaced screw members engageable against the other end of said cylinder, said adjusting means and said securing means being easily accessible and operable even while the machine is in operation, and delivery means for discharging the filled and sealed cartons from the machine.

9. A machine for forming cartons of paperboard or the like from blanks having a thermoplastic moistureproof coating on their inner and outer surfaces and score lines therein defining top and bottom closure parts, said machine comprising in combination a magazine adapted to hold a supply of said blanks, a mandrel assembly rotatably driven with a step by step indexing motion, means for feeding blanks successively from said magazine to said mandrel assembly and for erecting said blanks into open ended tubular form as an incident to such feeding, means defining a plurality of stations with which said mandrel assembly is adapted to register for breaking the folds of the bottom closure parts, heating the same for activating the thermoplastic thereon and closing and sealing said bottom closure parts, conveyer means, means for stripping cartons successively from said mandrel assembly in upright position and transferring said cartons to said conveyer means, said conveyer means being adapted for moving said blanks as partially formed cartons linearly with a step by step indexing motion successively into registration with top breaker means, filler means, heating means for heating the top closure parts of the carton blanks to adhesively activate the thermoplastic coating and top closure means, said top closure means including a support, a member adjustably secured to said support, a pair of jaws arranged to engage opposite sides of the sealing lips of the top closure parts of a carton, one of said jaws being fixed to said member and the other of said jaws carried by said member and being movable relative thereto in directions toward and away from said first mentioned jaw, means for moving said movable jaw, means for adjusting the position of said member and said jaws as a unit to effect proper alinement of the top closure parts of cartons with said jaws, and means for securing said member and said jaws in a position of adjustment, said adjusting means and said securing means being easily accessible and operable even while the machine is in operation, and delivery means for discharging the filled and sealed cartons from the machine.

References Cited
UNITED STATES PATENTS

| | | | |
|---|---|---|---|
| 3,001,377 | 9/1961 | Diquattro | 165—134 X |
| 3,041,941 | 7/1962 | Danielzig | 93—12 |
| 3,203,678 | 8/1965 | Sawyer et al. | 165—30 X |
| 1,563,323 | 12/1925 | Bergstein | 93—44.1 X |
| 2,113,591 | 4/1938 | Jacobs | 53—97 X |
| 2,352,797 | 7/1944 | Miller | 74—217 |
| 2,494,484 | 1/1950 | Nicolle | 53—371 X |
| 2,744,669 | 5/1956 | Ashe et al. | 53—39 X |
| 2,811,817 | 11/1957 | Mojonnier | 53—186 X |
| 2,821,830 | 2/1958 | Fahey | 53—202 X |
| 2,957,289 | 10/1960 | Monroe et al. | 53—186 |
| 3,028,798 | 4/1962 | Allen | 53—39 X |
| 3,120,089 | 2/1964 | Monroe et al. | 53—186 |
| 3,166,947 | 1/1965 | Hendershot | 74—216.5 |
| 3,196,760 | 7/1965 | Terry | 93—44.1 |
| 3,248,841 | 5/1966 | Heffelfinger et al. | 53—375 X |
| 3,248,843 | 5/1966 | Winters et al. | 53—39 |
| 3,239,995 | 3/1966 | Monroe et al. | 53—375 |

WILLIAM W. DYER, JR., *Primary Examiner.*

N. ABRAMS, *Assistant Examiner.*